(12) United States Patent
Baxter et al.

(10) Patent No.: US 10,549,229 B2
(45) Date of Patent: Feb. 4, 2020

(54) COMBINED CONDENSING DIRECT-CONTACT EXCHANGE AND SEPARATIONS

(71) Applicants: Larry Baxter, Orem, UT (US); Nathan Davis, Bountiful, UT (US)

(72) Inventors: Larry Baxter, Orem, UT (US); Nathan Davis, Bountiful, UT (US)

(73) Assignee: Hall Labs LLC, Provo, UT (US)

(*) Notice: Subject to any disclaimer, the term of this patent is extended or adjusted under 35 U.S.C. 154(b) by 192 days.

(21) Appl. No.: 15/724,725

(22) Filed: Oct. 4, 2017

(65) Prior Publication Data
US 2019/0099707 A1    Apr. 4, 2019

(51) Int. Cl.
*B01D 53/00* (2006.01)
*B01D 17/02* (2006.01)
*B01D 53/14* (2006.01)
*B01D 53/18* (2006.01)

(52) U.S. Cl.
CPC ....... *B01D 53/002* (2013.01); *B01D 17/0208* (2013.01); *B01D 53/1493* (2013.01); *B01D 53/18* (2013.01); *B01D 2252/103* (2013.01); *B01D 2252/2021* (2013.01); *B01D 2257/7022* (2013.01); *B01D 2257/80* (2013.01); *B01D 2258/0283* (2013.01)

(58) Field of Classification Search
CPC .......... B01D 17/0208; B01D 2252/103; B01D 2252/2021; B01D 2257/7022; B01D 2257/80; B01D 2258/0283; B01D 53/002; B01D 53/1493; B01D 53/18
See application file for complete search history.

(56) References Cited

U.S. PATENT DOCUMENTS

2018/0369744 A1* 12/2018 Baxter ................. F25J 3/08

* cited by examiner

*Primary Examiner* — Sharon Pregler

(57) ABSTRACT

Devices, systems, and methods for separating a vapor from a gas are disclosed. A gas is passed through a direct-contact exchanger. The exchanger using a contact liquid to cool the gas. The gas comprises a vapor. A portion of the vapor is condensed as the gas passes through the direct-contact exchanger, producing a product liquid and a vapor-depleted gas. The product liquid is immiscible in the contact liquid. The product liquid is gravity settled from the contact liquid such that the contact liquid and the product liquid separate in the direct-contact exchanger.

13 Claims, 6 Drawing Sheets

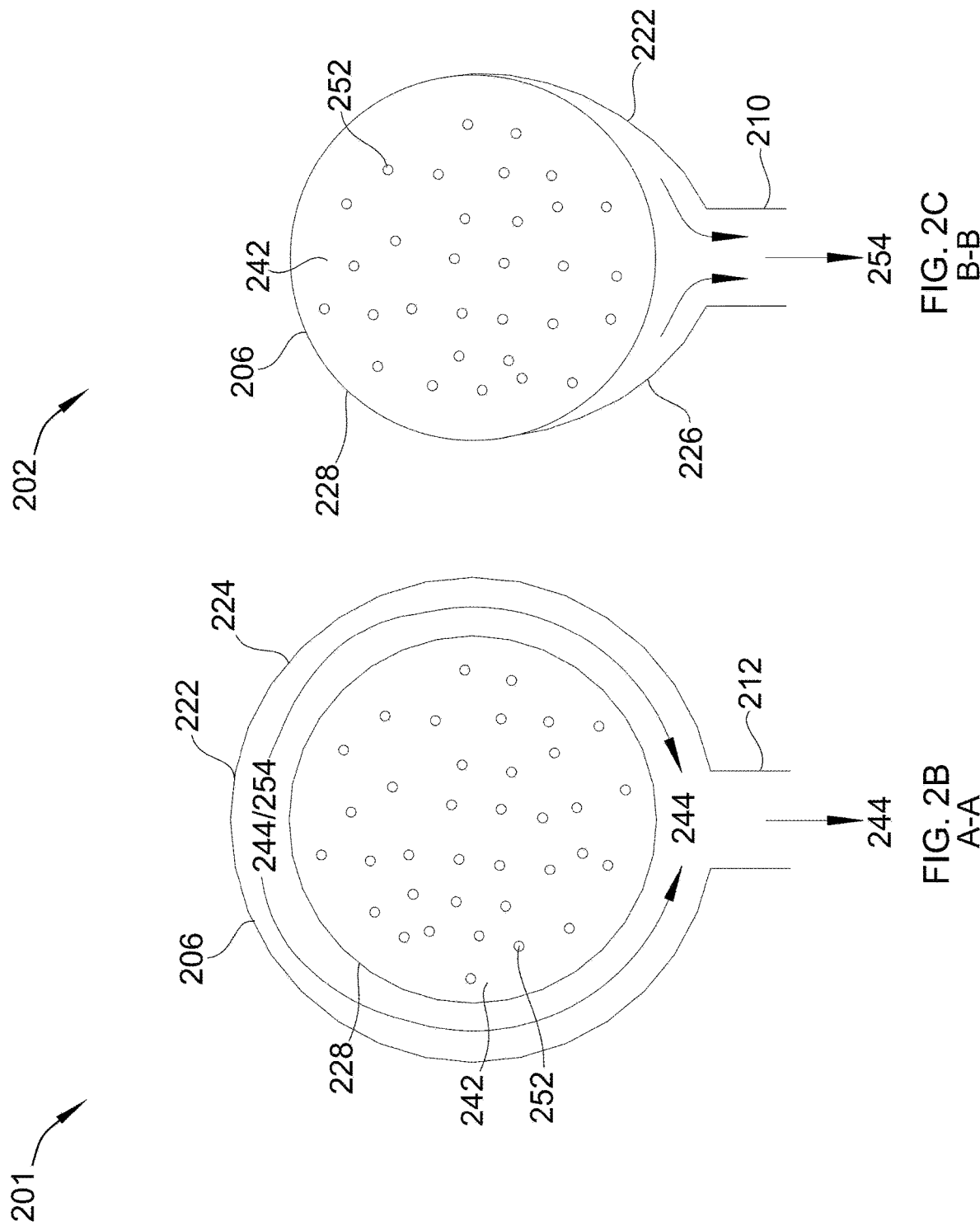

United States Patent

COMBINED CONDENSING DIRECT-CONTACT EXCHANGE AND SEPARATIONS

GOVERNMENT INTEREST STATEMENT

This invention was made with government support under DE-FE0028697 awarded by the Department of Energy. The government has certain rights in the invention.

FIELD OF THE INVENTION

The devices, systems, and methods described herein relate generally to gas-vapor separations. More particularly, the devices, systems, and methods described herein relate to using direct-contact heat and material exchange combined with liquid-liquid separations to separate vapors from gases.

BACKGROUND

Gas-vapor separations are a critical aspect of almost every industry. One method for accomplishing this involves condensation of the vapors into liquids. However, the resulting liquid-liquid separations or dissolved gas separations are often difficult (requiring heat, e.g., distillation) or requiring extra unit operations to finalize the gas-vapor separation. A device, system, and method for accomplishing gas-vapor separations without added energy and unit operations would be beneficial.

SUMMARY

Devices, systems, and methods for separating a vapor from a gas are disclosed. A gas is passed through a direct-contact exchanger. The exchanger using a contact liquid to cool the gas. The gas comprises a vapor. A portion of the vapor is condensed as the gas passes through the direct-contact exchanger, producing a product liquid and a vapor-depleted gas. The product liquid is immiscible in the contact liquid. The product liquid is gravity settled from the contact liquid such that the contact liquid and the product liquid separate in the direct-contact exchanger.

The direct-contact exchanger may comprise a cavity. A gas inlet may be coupled to the cavity. The gas may be passed through the gas inlet into the cavity. A contact liquid inlet may be coupled to the cavity. The contact liquid may pass through the contact liquid inlet into the cavity. The contact liquid may exchange heat with the gas in the cavity. The exchange of heat may condense at least a portion of the vapor in the gas to produce the product liquid and the vapor-depleted gas. The product liquid may be immiscible in the contact liquid. The product liquid and the contact liquid may gravity settle in the cavity such that the product liquid and the contact liquid separate. A product liquid outlet may be coupled to the cavity, wherein the gravity settled product liquid is decanted from the cavity through the product liquid outlet. A contact liquid outlet may be coupled to the cavity, wherein the gravity settled contact liquid is decanted from the cavity through the contact liquid outlet. The product liquid outlet may be situated at a bottom portion of the stilling well and the contact liquid outlet may be situated above an interface of the contact liquid and the product liquid in the stilling well. A gas outlet may be coupled to the cavity, wherein the vaper-depleted gas is output through the gas outlet. The contact liquid outlet may be situated at a bottom portion of the stilling well and the product liquid outlet may be situated above an interface of the contact liquid and the product liquid in the stilling well.

The product liquid and the contact liquid may be decanted out of the direct-contact exchanger into separate vessels.

The direct-contact exchanger may further comprise a bubble contactor, a spray tower, a distillation column, a packed tower, a liquid-liquid extractor, or a combination thereof. The direct-contact exchanger may further comprise an overflow weir spilling into a stilling well, the contact liquid and the product liquid separating in the stilling well.

The contact liquid and the product liquid may comprise a polar compound and a non-polar compound; a non-polar compound and a polar compound; a first material and a second material, wherein the first material has a strong affinity for itself and a weak affinity for the second material; a first material and a second material, wherein the second material has a strong affinity for itself and a weak affinity for the first material; a first material of a first pure-component density and a second material of a second pure-component density, wherein the first pure-component density and the second pure-component density are substantially different; or a combination thereof.

The contact liquid may comprise a mixture comprising a mixture of a solvent and a compound from a group consisting of ionic compounds and soluble organic compounds. The ionic compounds may comprise potassium carbonate, potassium formate, potassium acetate, calcium magnesium acetate, magnesium chloride, sodium chloride, lithium chloride, and calcium chloride. The soluble organic compounds may comprise glycerol, ammonia, propylene glycol, ethylene glycol, ethanol, and methanol.

The solvent may comprise water, hydrocarbons, liquid ammonia, liquid carbon dioxide, cryogenic liquids, or combinations thereof.

The gas may comprise flue gas, syngas, producer gas, natural gas, steam reforming gas, hydrocarbons, light gases, refinery off-gases, organic solvents, water, ammonia, liquid ammonia, or combinations thereof.

The vapor may comprise carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2B shows a cross-sectional view of section A-A of FIG. 2A.

FIG. 2C shows a cross-sectional view of section B-B of FIG. 2A.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the described devices, systems, and methods.

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air (which is typically 78% nitrogen and 20% oxygen, for example) leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The systems, methods, and devices disclosed herein apply to any combustion flue gases.

It is appreciated that dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

Figure 1:
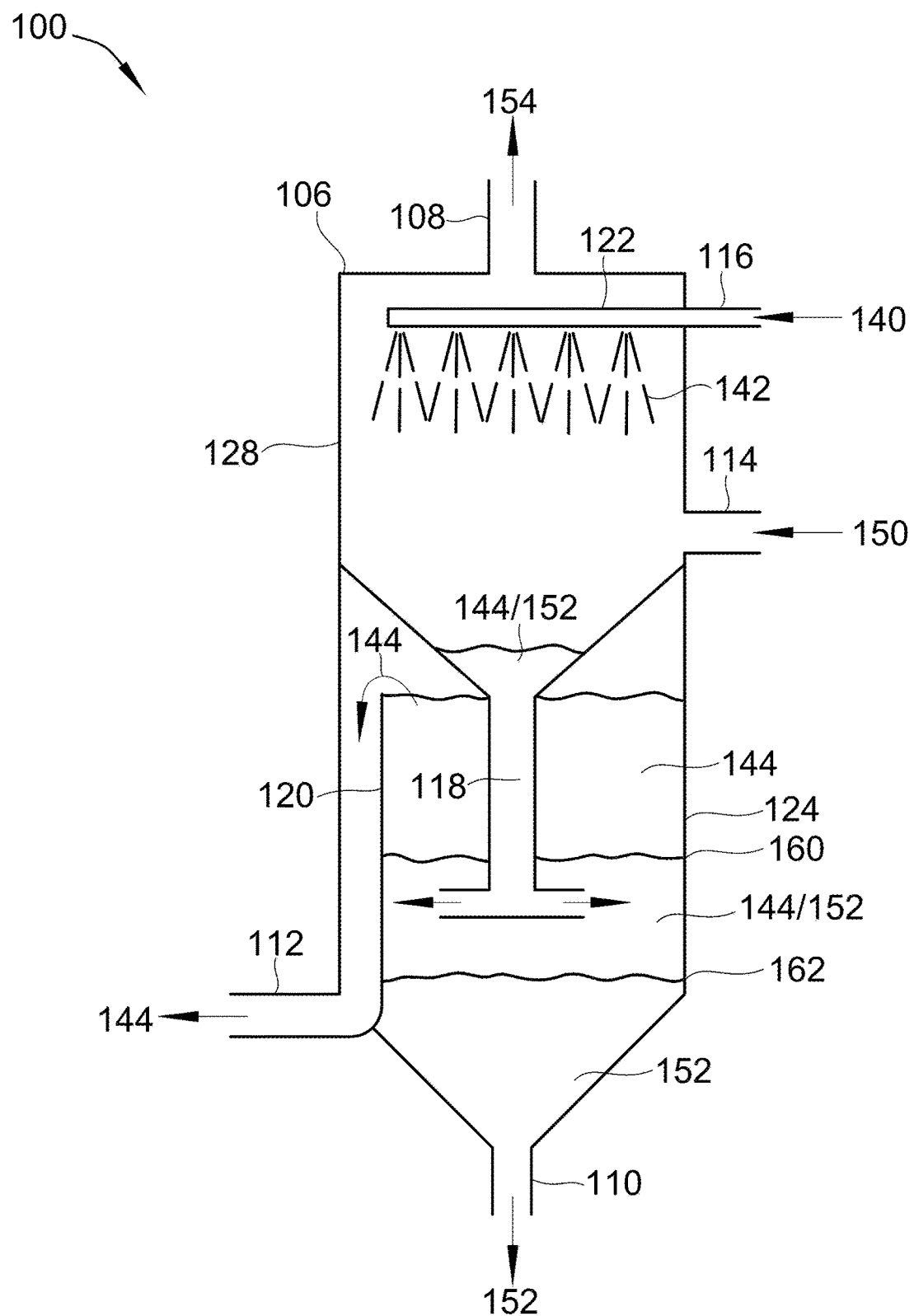
FIG. 1 shows a cross-sectional side view of a combined spray tower and decanter.

Referring now to the Figures, FIG. 1 is a cross-sectional side view 100 of a combined spray tower and decanter 106 that may be used in the described devices, systems, and methods. Combined spray tower and decanter 106 comprises an upper section, comprising spray tower 128, and a lower section, comprising decanter 124. Spray tower 128 comprises gas inlet 114, contact liquid inlet 116, spray nozzles 122, gas outlet 108, and transfer pipe 118. Decanter 124 comprises bottom outlet 110, overflow weir 120, and top outlet 112. The liquid outlet for spray tower 128 and the liquid inlet for decanter 124 are both transfer pipe 118.

Gas 150 is passed into spray tower 128 through gas inlet 114. Gas 150 comprises a vapor. Contact liquid 140 is passed through liquid inlet 116 and sprayed as mist 142 into spray tower 128 via nozzles 122. Gas 150 passes across descending mist 142 (in a counter-current manner, for example), gas 150 absorbing heat from the descending mist 142 such that a portion of the vapor condenses to produce product liquid 152, vapor-depleted gas 154, and warm contact liquid 144. Vapor-depleted gas 154 passes out of spray tower 128 through gas outlet 108. The combined warm contact liquid 144/product liquid 152 passes through transfer pipe 118 into decanter 124. As illustrated, transfer pipe 118 may pass warm contact liquid 144/product liquid 152 into a middle portion of decanter 124 between first interface 160 and second interface 162. Combined warm contact liquid 144/product liquid 152 separate in decanter 124 into layers, with a substantially pure product liquid 152 below second interface 162 (e.g., an interface between the substantially pure product liquid 152 and the combined warm contact liquid 144/product liquid 152), and a substantially pure warm contact liquid 144 above first interface 160 (e.g., an interface between the substantially pure warm contact liquid 144 and the combined warm contact liquid 144/product liquid 152). First interface 160 and second interface 162 may be distinct lines separating pure and mixed liquids, or may be a gradual transition interface, with the purity climbing over a distance. Warm contact liquid 144 decants over overflow weir 120 and leaves through top outlet 112. Product liquid 152 decants out through bottom outlet 110. By combining direct-contact exchange, immiscible fluids, and decanting into one vessel, the vapor is not only extracted from the gas, but the resulting product liquid is readily removed from the contact liquid without extra unit operations and with reduced insulation requirements. This reduces capital and operating costs and simplifies the overall gas-vapor separation.

In other embodiments, the density of the warm contact liquid is greater than the density of the product liquid, resulting in the layers switching.

In one embodiment, contact liquid 140 comprises a eutectic mixture of water and lithium chloride. Gas 150 comprises nitrogen with a pentane vapor. As pentane and water are substantially immiscible, pentane condensed out of gas 150 will form an immiscible layer in decanter 124.

In another embodiment, contact liquid 140 comprises methanol. Gas 150 comprises nitrogen with a hexane vapor. As hexane and methanol are substantially immiscible, pentane condensed out of gas 150 will form an immiscible layer in decanter 124.

Figure 2A:
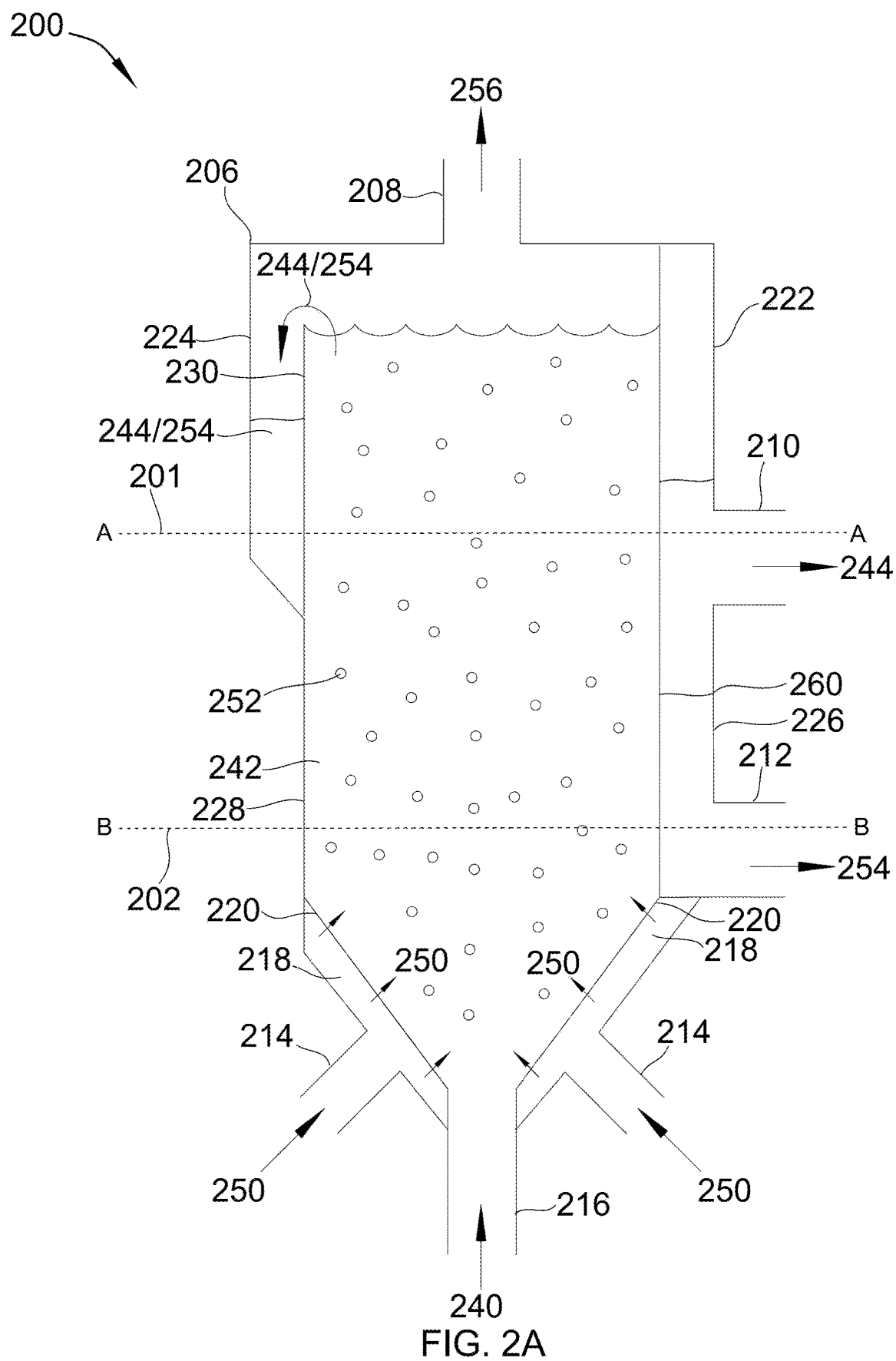
FIG. 2A shows a cross-sectional view of a combined bubble column and decanter.
Figure 2D:
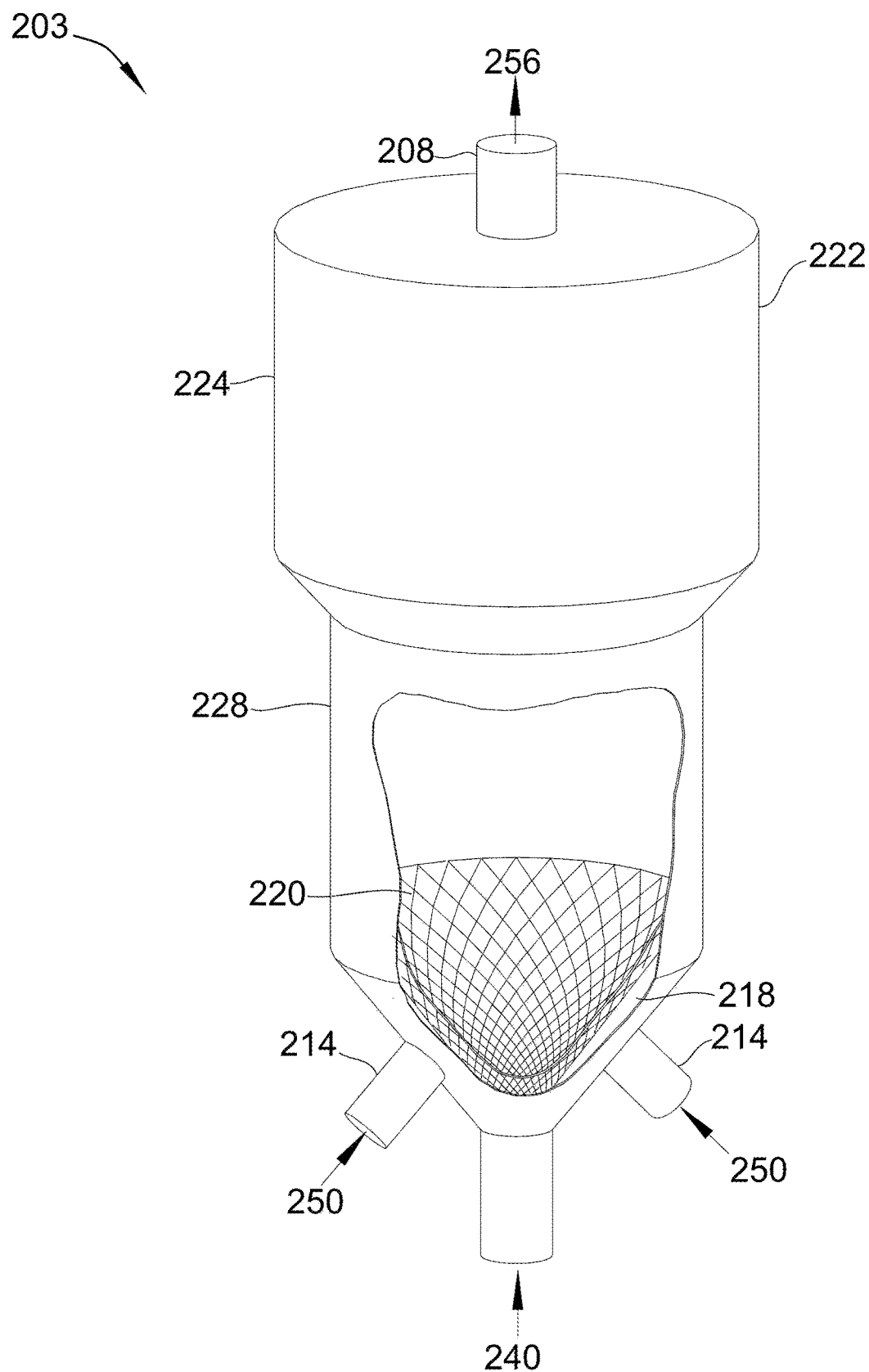
FIG. 2D shows a back, top, isometric cutaway view of the combined bubble column and decanter of FIG. 2A.
Figure 2E:
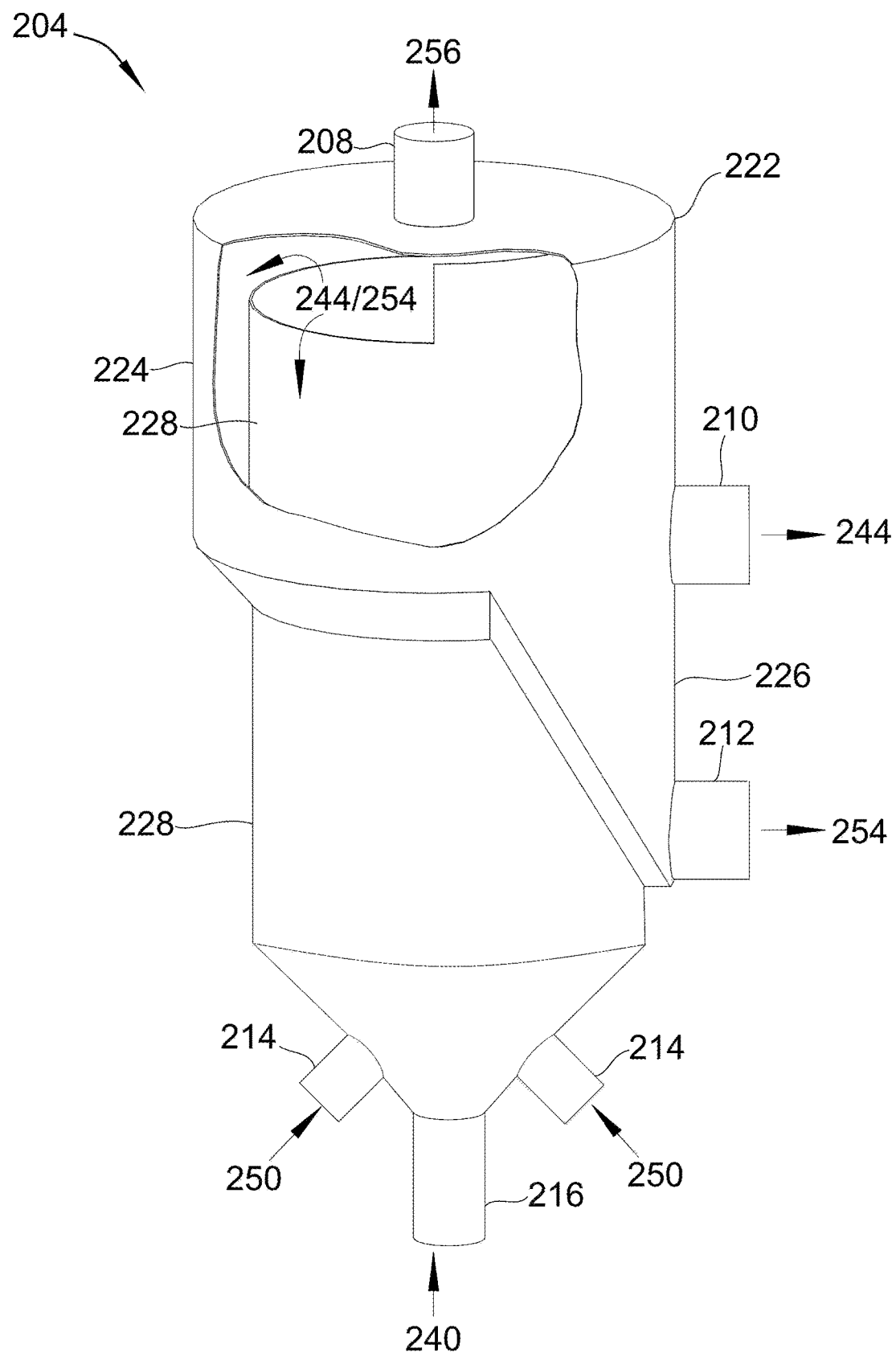
FIG. 2E shows a side, top, isometric cutaway view of the combined bubble column and decanter of FIG. 2A.

Referring to FIG. 2A, FIG. 2A shows a cross-sectional view 200 of a combined bubble column and decanter 206 that may be used in the described devices, systems, and methods. FIG. 2B shows a cross-sectional view 201 of section A-A of FIG. 2A. FIG. 2C shows a cross-sectional view 202 of section B-B of FIG. 2A. FIG. 2D shows a back, top isometric cutaway view of the combined bubble column and decanter 206 of FIG. 2A. FIG. 2E shows a side, top isometric cutaway view of the combined bubble column and decanter 206 of FIG. 2A. Combined bubble column and decanter 206 comprises bubble column 228 and decanting stilling wells 224. Bubble column 228 comprises liquid inlet 240, overflow weir 230, gas inlets 214, gas plenum 218, porous wall 220, and gas outlet 208. Decanting stilling well 222 comprises upper section 224 and lower section 226. Lower section 226 comprises top outlet 210 above and bottom liquid outlet 212 below liquid-liquid interface 260.

Contact liquid 240 (e.g., contact liquid 140) enters bubble column 228 through liquid inlet 216. Gas 250 (e.g., gas 150) enters gas plenum 218 through gas inlet 214. Gas 250, comprising a vapor, crosses porous wall 220, forming bubbles 252 that ascend co-current with contact liquid 240, extracting heat from contact liquid 240 such that at least a portion of the vapor condenses, producing product liquid 254, warm contact liquid 242, and vapor-depleted gas 256. Vapor-depleted gas 256 passes out of bubble column 228 through gas outlet 208. The combined warm contact liquid 244/product liquid 254 passes over overflow weir 230 into upper section 224 of decanting still well 222. Combined warm contact liquid 244/product liquid 254 separate into layers as they spill from upper section 224 into lower section 226, with product liquid 254 below interface 260 and warm contact liquid 244 above interface 260. Warm contact liquid 244 decants out top outlet 210. Product liquid 254 decants out through bottom outlet 212. In other embodiments, the density of the warm contact liquid is greater than the density of the product liquid, resulting in the layers switching.

Figure 3:
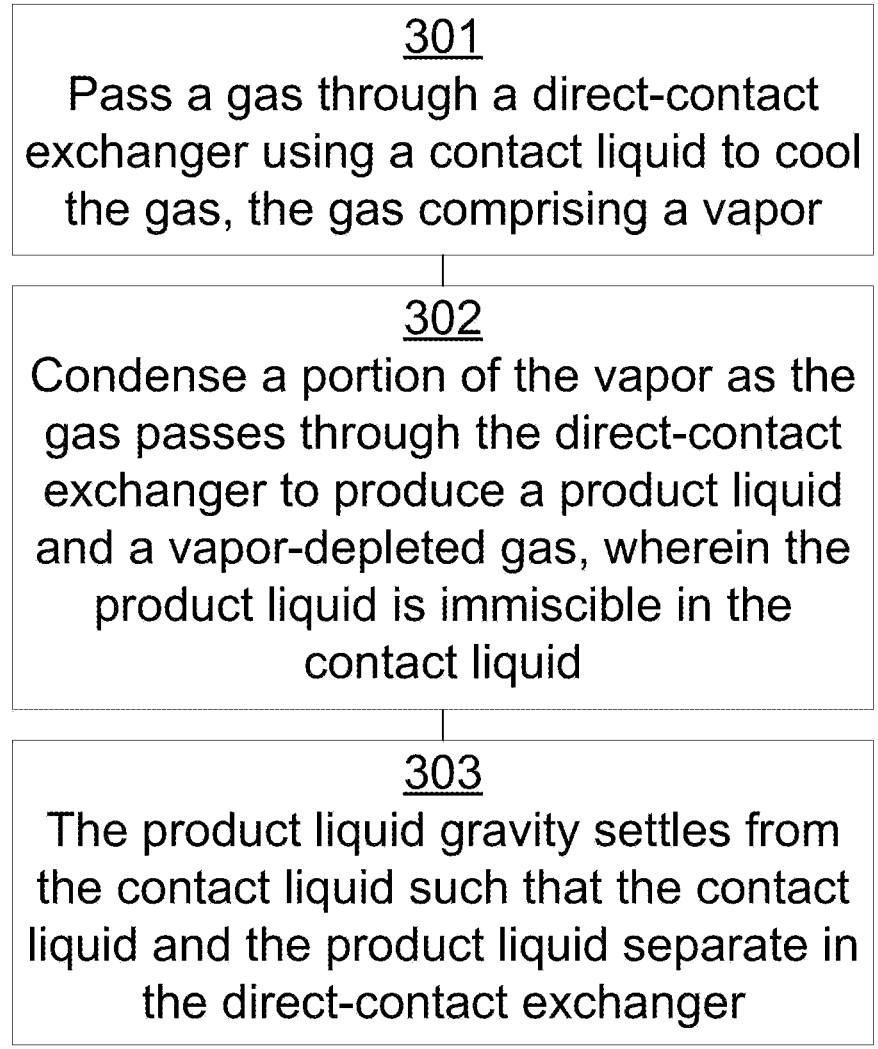
FIG. 3 shows a method for separating a vapor from a gas.

Referring to FIG. 3, FIG. 3 shows a method 300 for separating a vapor from a gas that may be used in the described devices, systems, and methods. A gas is passed through a direct-contact exchanger, the direct-contact exchanger using a contact liquid to cool the gas, wherein the gas comprises a vapor 301. A portion of the vapor is condensed as the gas passes through the direct-contact exchanger to produce a product liquid and a vapor-depleted gas, wherein the product liquid is immiscible in the contact liquid 302. The product liquid gravity settles from the contact liquid such that the contact liquid and the product liquid separate in the direct-contact exchanger 303. In some embodiments, the product liquid forms a layer above the contact liquid. In other embodiments, the product liquid forms a layer below the contact liquid. In some embodiments, the product liquid is substantially pure while the contact liquid has a portion of the product liquid entrained. In other embodiments, the contact liquid is substantially pure while the product liquid has a portion of the contact liquid entrained.

We claim:

1. A method for separating a vapor from a gas comprising:
    passing a gas through a direct-contact exchanger, the direct-contact exchanger using a contact liquid to cool the gas, wherein the gas comprises a vapor;
    condensing a portion of the vapor as the gas passes through the direct-contact exchanger to produce a product liquid and a vapor-depleted gas, wherein the product liquid is immiscible in the contact liquid; and,
    gravity settling the product liquid from the contact liquid such that the contact liquid and the product liquid separate in the direct-contact exchanger.

2. The method of claim 1, further comprising decanting the product liquid and the contact liquid out of the direct-contact exchanger into separate vessels.

3. The method of claim 2, wherein the direct-contact exchanger further comprises a bubble contactor, a spray tower, a distillation column, a packed tower, a liquid-liquid extractor, or a combination thereof.

4. The method of claim 3, wherein the direct-contact exchanger further comprises a gas inlet, a gas outlet, a contact liquid inlet, a product liquid outlet, and a contact liquid outlet.

5. The method of claim 4, wherein the gas enters the exchanger through the gas inlet, the vapor-depleted gas exits the exchanger through the gas outlet, the contact liquid enters the exchanger through the contact liquid inlet, the product liquid exits the exchanger through the product liquid outlet, and the contact liquid exits the exchanger through the contact liquid outlet.

6. The method of claim 5, wherein the direct-contact exchanger further comprises an overflow weir spilling into a stilling well, the contact liquid and the product liquid separating in the stilling well.

7. The method of claim 6, wherein the product liquid outlet is situated at a bottom portion of the stilling well and the contact liquid outlet is situated above an interface of the contact liquid and the product liquid in the stilling well.

8. The method of claim 6, wherein the contact liquid outlet is situated at a bottom portion of the stilling well and the product liquid outlet is situated above an interface of the contact liquid and the product liquid in the stilling well.

9. The method of claim 1, wherein the contact liquid and the product liquid comprise:
    a polar compound and a non-polar compound;
    a non-polar compound and a polar compound;
    a first material and a second material, wherein the first material has a strong affinity for itself and a weak affinity for the second material;
    a first material and a second material, wherein the second material has a strong affinity for itself and a weak affinity for the first material;
    a first material of a first pure-component density and a second material of a second pure-component density, wherein the first pure-component density and the second pure-component density are substantially different; or,
    a combination thereof.

10. The method of claim 1, wherein the contact liquid comprises a mixture comprising a mixture of a solvent and a compound from a group consisting of:
    ionic compounds comprising potassium carbonate, potassium formate, potassium acetate, calcium magnesium acetate, magnesium chloride, sodium chloride, lithium chloride, and calcium chloride; and,
    soluble organic compounds comprising glycerol, ammonia, propylene glycol, ethylene glycol, ethanol, and methanol.

11. The method of claim 10, wherein the solvent comprises water, hydrocarbons, liquid ammonia, liquid carbon dioxide, cryogenic liquids, or combinations thereof.

12. The method of claim 1, wherein the gas comprises flue gas, syngas, producer gas, natural gas, steam reforming gas, hydrocarbons, light gases, refinery off-gases, organic solvents, water, ammonia, liquid ammonia, or combinations thereof.

13. The method of claim 12, wherein the vapor comprises carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, or combinations thereof.

* * * * *